United States Patent
Castillo et al.

(10) Patent No.: US 7,922,229 B1
(45) Date of Patent: Apr. 12, 2011

(54) RECONFIGURABLE BODY EXTERIOR PANEL ASSEMBLY FOR VEHICLE

(75) Inventors: Brian V. Castillo, Royal Oak, MI (US); Wade W. Bryant, Grosse Pointe Farms, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/685,147

(22) Filed: Jan. 11, 2010

(51) Int. Cl.
*B60J 7/00* (2006.01)

(52) U.S. Cl. ............... 296/26.11; 296/26.01; 296/26.08; 296/186.3; 296/190.08

(58) Field of Classification Search ............... 296/26.01, 296/26.08, 26.09, 26.1, 26.11, 181.1, 181.2, 296/181.3, 181.7, 1, 186.3, 181.5, 193.04, 296/193.08, 35.3, 152, 198.08, 146.1, 147, 296/148, 146.11, 146.12, 191, 10, 186.1, 296/186.4, 186.5, 107.08, 107.17, 124; 410/121, 410/129
See application file for complete search history.

(56) References Cited

U.S. PATENT DOCUMENTS

| | | | | |
|---|---|---|---|---|
| 3,169,792 | A * | 2/1965 | Solano Viquez | 296/99.1 |
| 4,223,939 | A * | 9/1980 | Beggs | 296/26.11 |
| 5,087,091 | A * | 2/1992 | Madill | 296/26.11 |
| 6,131,980 | A * | 10/2000 | Sankrithi | 296/26.11 |
| 6,412,847 | B2 * | 7/2002 | De Gaillard | 296/26.02 |
| 6,517,135 | B2 * | 2/2003 | de Gaillard | 296/26.09 |
| 6,554,340 | B1 * | 4/2003 | Stevenson | 296/26.11 |
| 6,561,560 | B2 * | 5/2003 | Brown et al. | 296/26.11 |
| 6,609,743 | B1 * | 8/2003 | Stevenson | 296/26.11 |
| 6,742,834 | B1 * | 6/2004 | Merritt et al. | 296/190.11 |
| 6,837,529 | B2 * | 1/2005 | Kharod et al. | 296/24.4 |
| 7,226,100 | B1 * | 6/2007 | Willey et al. | 296/26.11 |
| 7,607,709 | B1 * | 10/2009 | Bryant | 296/26.01 |
| 7,677,626 | B2 * | 3/2010 | Hanzel | 296/26.11 |
| 2005/0194819 | A1 * | 9/2005 | Peart | 296/190.08 |

* cited by examiner

*Primary Examiner* — Glenn Dayoan
*Assistant Examiner* — Gregory Blankenship

(57) ABSTRACT

A vehicle has a body with a body opening and a reconfigurable body exterior panel that is mountable over the opening in first and second panel positions. The panel is pivotable about a panel pivot axis and is mounted on a pair of swing arms that are pivotable relative to the body about a bodyside pivot axis. The swing arms are Z-shaped and interact with stops to orient the panel in the first and second panel positions.

15 Claims, 4 Drawing Sheets

US 7,922,229 B1

RECONFIGURABLE BODY EXTERIOR PANEL ASSEMBLY FOR VEHICLE

BACKGROUND OF INVENTION

The present invention relates generally to exterior body panels for vehicles and more particularly to exterior body panels that are easily reversible to selectively reconfigure the vehicle.

Automotive vehicles such as pickup trucks, sport utility vehicles and crossovers include cargo areas that may be distinct from passenger areas. The passenger compartments, crew cabs, or interiors of pickup trucks may include a fixed wall, panel, or bulkhead that is positioned behind the rearmost row of seats. The bulkhead separates the interior from a rear cargo area. The typical bulkhead is a stationary metal panel that is supported at or along its perimeter by the vehicle body. In some vehicles, the bulkhead is replaced with a midgate assembly having one or more hinged door panels and/or windows for accessing the rear cargo area. However, conventional bulkheads or mid-gate assemblies may be less than optimal for certain purposes.

Thus, it has been proposed to provide a movable bulkhead that defines the divide between the passenger compartment and the cargo area and allows one to essentially reconfigure the divide between the passenger and cargo areas. Such a movable bulkhead is disclosed in U.S. Pat. No. 7,607,709, titled Reversible Bulkhead Assembly for a Vehicle, which is incorporated herein by reference.

It is desirable that a movable exterior body panel for these vehicles is inexpensive, uncomplicated and reliable, as well as being relatively easy for one to reconfigure the body panel—even a relatively large, heavy panel.

SUMMARY OF INVENTION

An embodiment contemplates a vehicle comprising a body and a reconfigurable body exterior panel. The body includes a body opening surface defining a perimeter of a body opening. The exterior panel has a first surface configured to mount against the body opening surface in a first panel position and a second surface configured to mount against the body opening surface in a second panel position where the exterior panel is in a different orientation relative to the body than when in the first panel position. A pair of panel-side pivot pins are secured to the exterior panel and define a panel pivot axis about which the exterior panel is pivotable. A pair of swing arms each have a first end mounted to a respective one of the panel-side pivot pins and a second opposed end. A pair of bodyside pivot pins mount to the respective second ends of the swing arms and are pivotally secured relative to the body for allowing pivoting of the swing arms relative to the body. A first mode stop mounts to the exterior panel spaced from the panel-side pivot pins and is configured to engage one of the swing arms to prevent further rotation of the exterior panel relative to the swing arms in a first direction when the exterior panel is in the first panel position, and a second mode stop mounts to the exterior panel and is spaced from the first mode stop and the panel-side pivot pins and configured to engage one of the swing arms to prevent further rotation in a second, opposed direction when the exterior panel is in the second panel position.

An advantage of an embodiment is that easy, single operator reconfiguration of a body exterior panel is achieved without a need to remove the panel from its supporting structure. Even large heavy panels can be manipulated since the structure supports the panel during reconfiguration. By not having to remove the panel, this eliminates the possibility of loss or damage of the panel during handling. Moreover, the body panel assembly allows for positioning of the panel at arbitrary angular positions dictated by desired styling and function of the panel and vehicle body while allowing for proper functioning even with build variation and panel deflection.

DETAILED DESCRIPTION

Figure 1:
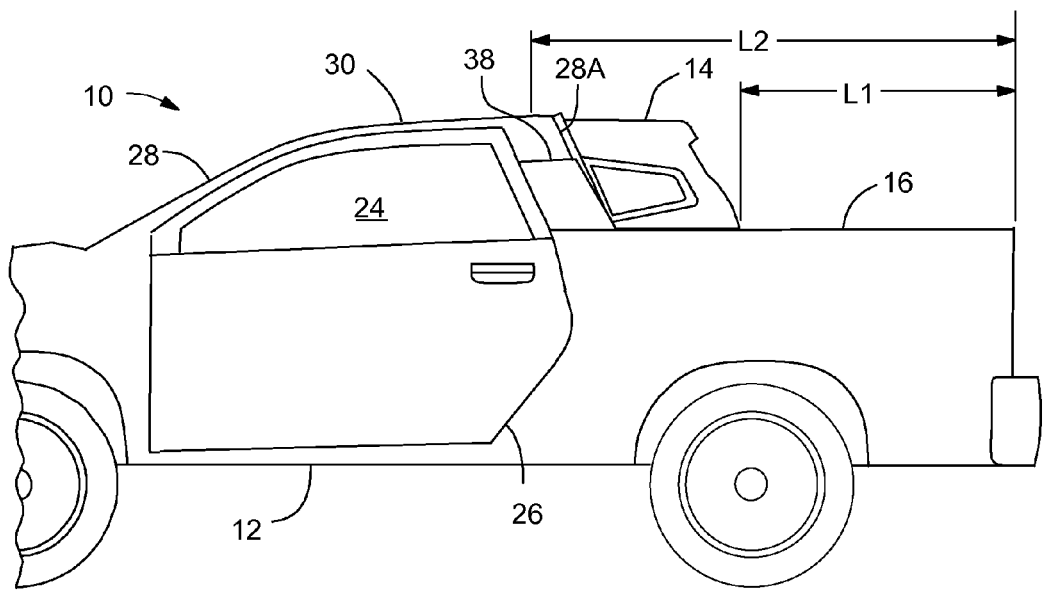
FIG. 1 is a schematic side view of a vehicle having a reconfigurable body exterior panel assembly.
Figure 2:
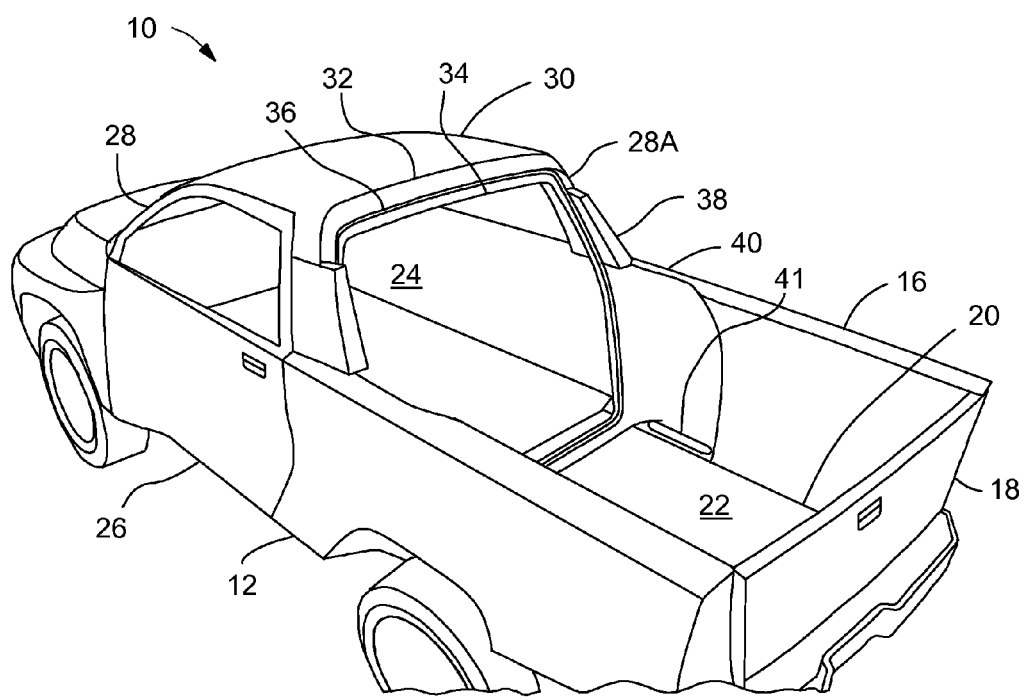
FIG. 2 is a schematic perspective view of the vehicle of FIG. 1, but with the reconfigurable body exterior panel assembly removed.

Referring to FIGS. 1 and 2, portions of a vehicle, indicated generally at 10, are shown. The vehicle 10 includes a body 12 and reconfigurable body exterior panel, in this exemplary embodiment a reversible bulkhead assembly 14. In the embodiment shown in FIG. 1, the vehicle 10 is a pickup truck, which includes a pair of opposed cargo box sidewalls 16, a tailgate 18 and a floor or bed 20 that at least partially define a rear cargo area 22. However, within the scope of the invention, the vehicle may be another body style such as a sport utility vehicle, a crossover vehicle, a work truck or recreational vehicle having a cargo area similar to that of the cargo area 22, whether such a cargo area is open or partially/fully enclosed. Moreover, while the reconfigurable body exterior panel assembly is illustrated as a reversible bulkhead, it is contemplated that a panel, such as for example, a reversible truck bed floor having two sides with different characteristics (such as a smooth side and a gripping side) or a combination truck-bed-liner/truck-cap reversible panel may be within the scope of the invention.

The body 12 defines a passenger cabin in an interior 24 that is adjacent to the bed 20, with conventional doors 26 providing access to the interior 24. The body 12 also includes pillars 28 that extend upward and support a roof 30. The pair of pillars 28A that separate the interior 24 from the cargo area 22 form a portion of an opening 34 that is formed in the body 12, with the reversible bulkhead 14, discussed below, secured over this opening 34. A rear surface 32 around the perimeter of the opening 34 may include a seal 36 that seals against the bulkhead 14 to ensure that the interior 24 is protected from the elements. In order to secure the bulkhead 14 to the seal 36 and opening 34, clasps, clamps or latches 38 may be employed. The latches 38 may be any suitable type of conventional latches and so will not be disclosed in more detail herein.

Figure 7:
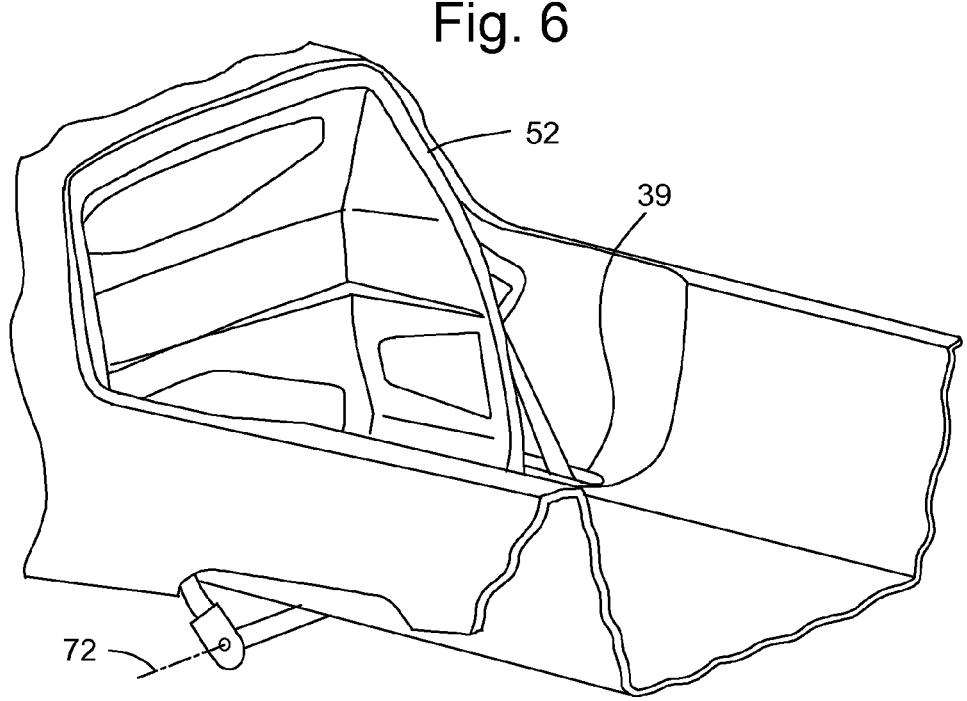
FIG. 7 is a schematic perspective view similar to FIG. 4 but with the reconfigurable body exterior panel in a cargo mode position.

The body 12 supports the bulkhead 14, even when it is being reconfigured. By reconfigured, it is meant that its orientation relative to the body 12 can be changed in order to accommodate different uses for the vehicle 10. In the particular exemplary embodiment illustrate, the bulkhead 14 can be reconfigured by being reversed, i.e. flipped, between a forward facing and a rear facing position in the vehicle 10. That is, the bulkhead 14 is shaped and sized to allow the bulkhead 14 to be selectively rotated between a first configuration (a "cargo mode"), as shown in FIG. 7, and a second configuration (a "passenger mode"), as shown in FIG. 1. Thus, due to the convex/concave shape of the bulkhead 14, when the bulkhead 14 is in the first configuration, the length (L2) of the cargo area 22 is increased (as can be best seen in FIG. 7), and when the bulkhead 14 is in the second configuration, the length (L1) of the cargo area 22 is decreased (as can be seen in FIG. 1). Of course, for the second configuration, then, the size of the interior 24 (in this exemplary embodiment the passenger compartment) is increased.

The cargo box side walls 16 include reduced width portions 40 adjacent to the opening 34, with a pair of bulkhead support slots 41 extending through the bed 20 below the reduced width portions 40. Alternatively, the cargo box side walls may have more of a constant width, with the bulkhead support slots located inboard farther (and a correspondingly smaller bulkhead), or the cargo box side walls may have more of a constant width, with the bulkhead support slots extending through the tops of the cargo box side walls, if so desired.

Figure 3:
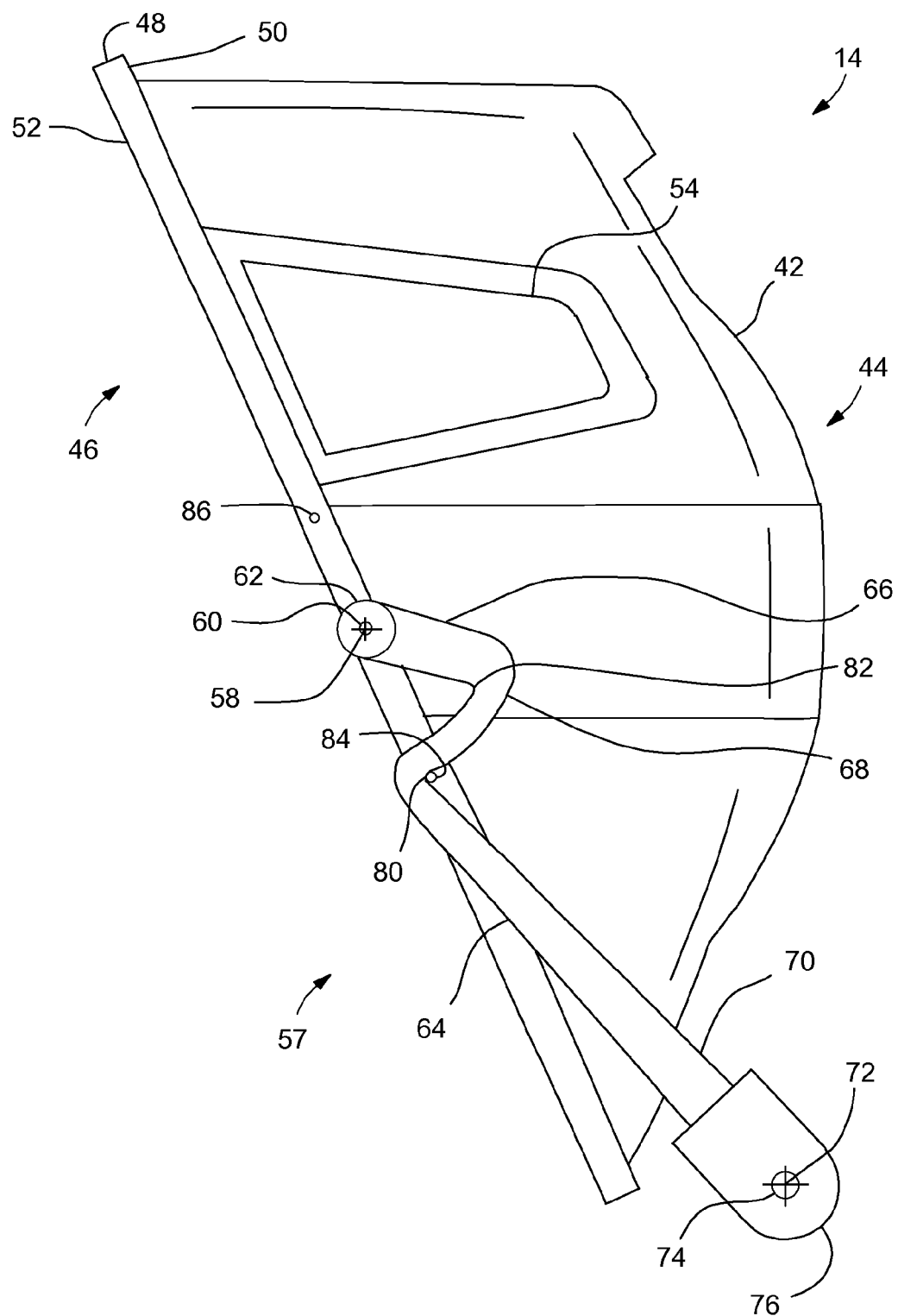
FIG. 3 is a side view of the reconfigurable body exterior panel assembly that is employed in the vehicle of FIG. 1.

Referring now to FIG. 3 in view of FIGS. 1 and 2, the reconfigurable body exterior panel assembly, in this case a reversible bulkhead assembly 14, will be discussed in more detail. The bulkhead 14 may be formed of a suitable material for use on an exterior of a vehicle. The bulkhead 14 includes walls 42 that are shaped to provide the bulkhead 14 with a convex side 44 and an opposed concave side 46. A sealing flange 48 around the periphery between the convex side 44 and the concave side 46 defines a first sealing surface 50 that contacts the seal 36 when the bulkhead is in the cargo mode and a second sealing surface 52 that contacts the seal 36 when the bulkhead is in the passenger mode. The bulkhead 14 may also include side windows 54 and/or rear windows 56 (shown in FIGS. 4-7) that are made of a suitable translucent material.

The bulkhead 14 includes two axes for pivoting and rotating that are defined by a bulkhead pivoting assembly 57 that supports the weight of the bulkhead 14. A first bulkhead pivot axis or panel pivot axis 58 is defined by bulkhead-side pivot pins 60 that pivotally connect the sealing flange 48 to bulkhead-side ends 62 of a pair of Z-shaped support arms or swing arms 64. Each of the swing arms 64 includes a bulkhead-side longitudinal portion 66, an intermediate portion 68, and a bodyside longitudinal portion 70. The bodyside longitudinal portions 70 extend down to the second bulkhead pivot axis or swing arm pivot axis 72 defined by bodyside pivot pins 74 at a bodyside end 76 of the swing arms 64. The bodyside pivot pins 74 are connected by a transverse support rod 78 (shown in FIGS. 4-7) that extends along the swing arm pivot axis 72.

Each of the swing arms 64 extends through a respective one of the bulkhead support slots 39, accordingly, the transverse support rod 78 extends under and is concealed by the bed 20 of the cargo area 22 and is supported by the body 12 under the bed 20.

Each Z-shaped swing arm 64 includes a passenger mode catch or stop 80 formed by at a crook of the swing arm 64 between the intermediate portion 68 and the bodyside longitudinal portion 70 and a cargo mode catch or stop 82 formed by a crook of the swing arm 64 between the intermediate portion 68 and the bulkhead-side longitudinal portion 66. A pair of passenger mode stop pins 84 extend from the sealing flange 48 and are located at the same radial distance from the panel pivot axis 58 as the passenger mode stops 80 allowing them to engage and limit the clockwise (as viewed in FIG. 3) travel of the walls 42 relative to the swing arms 64. A pair of cargo mode stop pins 86 extend from the sealing flange 48, on the opposite side of the panel pivot axis 58, and are located at the same radial distance from the panel pivot axis 58 as the cargo mode stops 82 allowing them to engage and limit the counterclockwise (as viewed in FIG. 3) travel of the walls 42 relative to the swing arms 64. Thus, the shape and size of the swing arms 64 and the locations of the stop pins 84, 86 define the extent of the pivoting the walls 42 can achieve relative to the swing arms 64.

Figure 4:
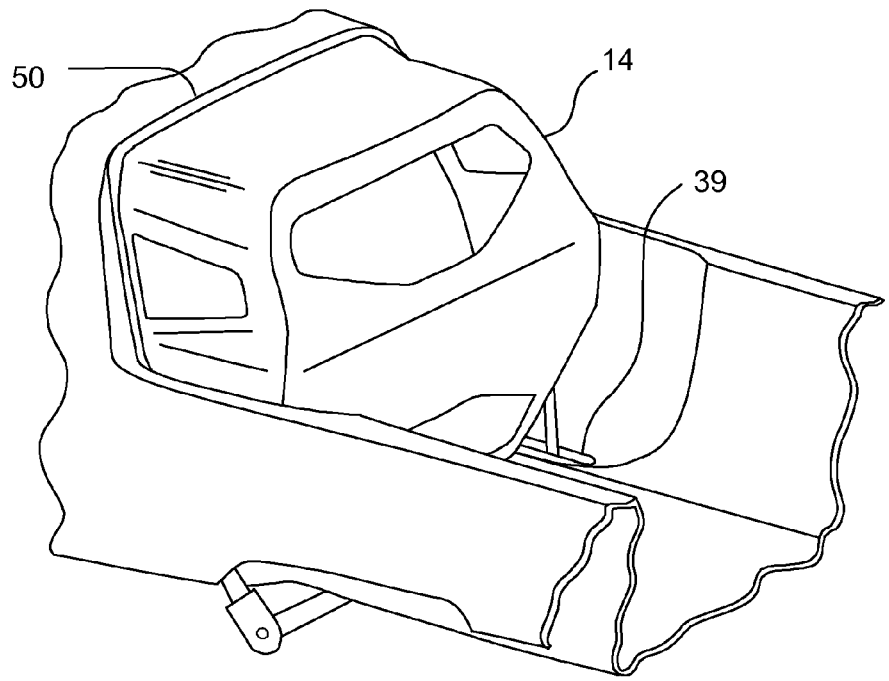
FIG. 4 is a schematic perspective view of a portion of the vehicle of FIG. 1 with the reconfigurable body exterior panel in a passenger mode position.

Referring to FIGS. 4-7, a portion of the process for switching from the passenger mode to the cargo mode is discussed. In FIG. 4, the bulkhead assembly 14 is in the passenger mode, with the second sealing surface 52 (shown in FIGS. 6 and 7) pressed against the seal 36 (shown in FIGS. 5 and 6). Latches, such as the latches 38 shown in FIGS. 1 and 2, secure the bulkhead 14 over the body opening 34 (shown in FIGS. 5 and 6). The passenger mode stop pins 84 (shown in FIGS. 3 and 6) are nested in the passenger mode stops 80 (as can be seen in FIG. 3). With the concave side facing forward, the room for passengers and other items in the vehicle interior is increased.

Figure 5:
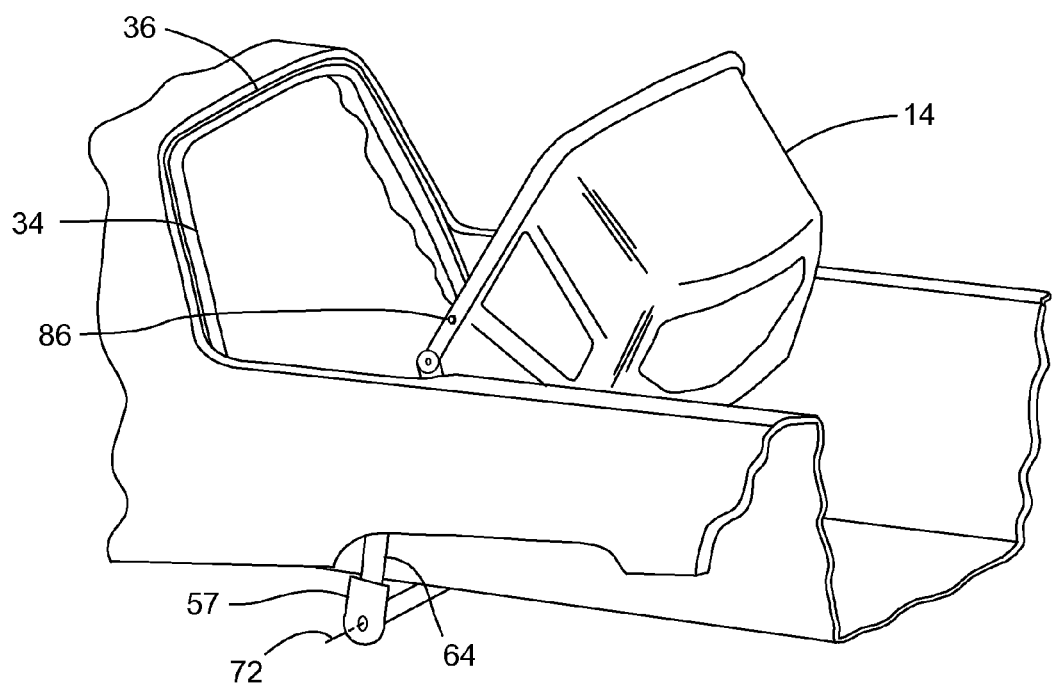
FIG. 5 is a schematic perspective view similar to FIG. 4, but showing the reconfigurable body exterior panel after pivoting about a swing-arm pivot axis away from the body opening.
Figure 6:
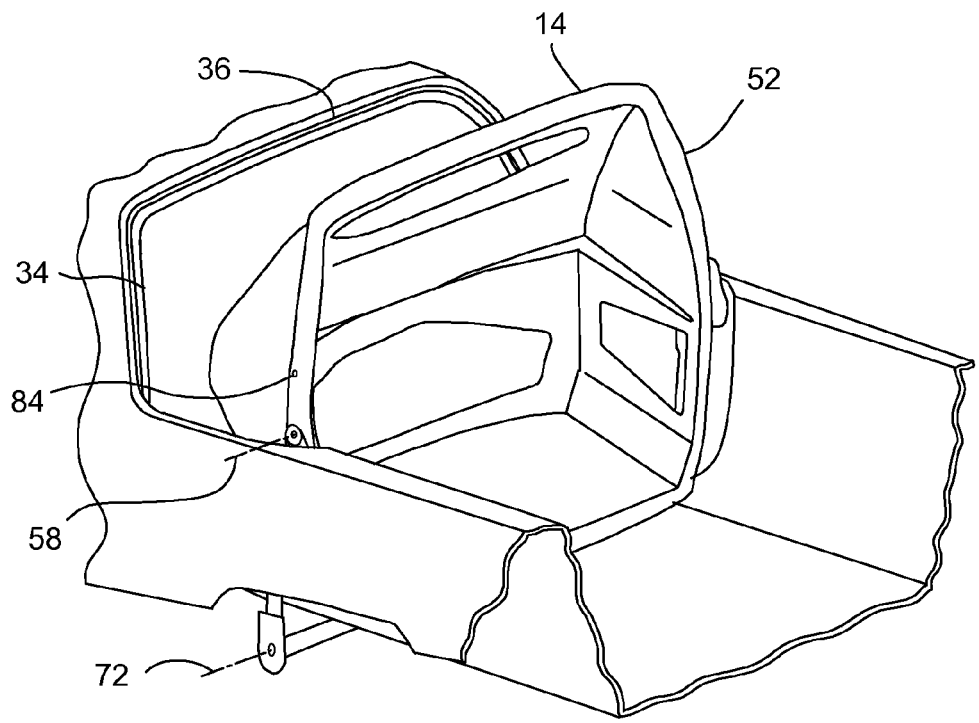
FIG. 6 is a schematic perspective view similar to FIG. 5, but showing the reconfigurable body exterior panel after pivoting about a panel pivot axis.

To reverse the bulkhead 14, the latches (or other mechanisms holing the bulkhead 14 against the vehicle body) are released. Then, as shown in FIG. 5, the bulkhead 14 is pivoted away from the opening 34 about the swing arm pivot axis 72. While pivoting, the swing arms 64 slide in the bulkhead support slots 39 (shown in FIGS. 4 and 7). Also during this pivoting motion, the weight of the bulkhead 14 is supported by the bulkhead pivoting assembly 57, thus minimizing the effort required by the person moving the bulkhead 14.

One then pivots the bulkhead 14 about the panel pivot axis 58 until the cargo mode stop pins 86 (which can be seen in FIG. 5) are nested in the cargo mode stops 82 (which can be seen in FIG. 3). The correct angle of rotation is achieved by rotating the bulkhead 14 from the one set of stops to the other set of stops. The bulkhead 14 is now pivoted into the position shown in FIG. 6. The operator may then pivot the bulkhead 14 about the swing arm pivot axis 72 until the first sealing surface 50 (shown in FIG. 4) is pressed against the seal 36. The latches are then re-engaged. The bulkhead 14 is now in the cargo mode position as shown in FIG. 7.

While certain embodiments of the present invention have been described in detail, those familiar with the art to which this invention relates will recognize various alternative designs and embodiments for practicing the invention as defined by the following claims.

What is claimed is:

1. A vehicle comprising:
   a body including a body opening surface defining a perimeter of a body opening;
   a reconfigurable body exterior panel having a first surface configured to mount against the body opening surface in a first panel position and a second surface configured to mount against the body opening surface in a second panel position where the exterior panel is in a different orientation relative to the body than when in the first panel position; a pair of panel-side pivot pins secured to the exterior panel and defining a panel pivot axis about which the exterior panel is pivotable; a pair of swing arms each having a first end mounted to a respective one of the panel-side pivot pins and a second opposed end; a pair of bodyside pivot pins mounted to the respective second ends of the swing arms and pivotally secured relative to the body for allowing pivoting of the swing arms relative to the body; a first mode stop mounted to the exterior panel spaced from the panel-side pivot pins and configured to engage one of the swing arms to prevent further rotation of the exterior panel relative to the swing arms in a first direction when the exterior panel is in the first panel position; and a second mode stop mounted to the exterior panel and spaced from the first mode stop and the panel-side pivot pins and configured to engage one of the swing arms to prevent further rotation in a second, opposed direction when the exterior panel is in the second panel position.

2. The vehicle of claim 1 wherein each of the swing arms are Z-shaped, including a panel-side portion extending away from the first end, a bodyside portion extending away from the second end and an intermediate portion extending in a nonparallel direction between and connecting the panel-side portion and the bodyside portion; an intersection of the panel-side portion and the intermediate portion forming a first catch that engages with the first mode stop to prevent further rotation in the first direction; and an intersection of the bodyside portion and the intermediate portion forming a second catch that engages with the second mode stop to prevent further rotation in the second direction.

3. The vehicle of claim 2 wherein the body opening is located on the body between a body interior portion defining a passenger compartment and a cargo area, and the exterior panel is a reconfigurable bulkhead that mounts over the body opening and defines a partition between the passenger compartment and the cargo area.

4. The vehicle of claim 3 wherein the bulkhead includes a convex side and an opposed concave side, the first panel position causes the concave side to face toward the passenger compartment defining a passenger mode with an increased volume of the passenger compartment, and the second panel position causes the convex side to face toward the passenger compartment defining a cargo mode with an increased volume of the cargo area relative to the passenger mode.

5. The vehicle of claim 4 wherein the vehicle is a pickup truck, the body includes a pair of cargo box side walls defining sides of the cargo area and a floor extending between the cargo box side walls defining a bottom of the cargo area, each of the side walls having full width rear portions and reduced with forward portions, with each of the reduced width forward portions being adjacent to a respective one of the swing arms; and the floor including a pair of bulkhead support slots, each of the support slots located adjacent to a respective one of the reduced width forward portions and having a respective one of the swing arms extending therethrough.

6. The vehicle of claim 1 wherein the body opening is located on the body between a body interior portion defining a passenger compartment and a cargo area, and the exterior panel is a reconfigurable bulkhead that mounts over the body opening and defines a partition between the passenger compartment and the cargo area.

7. The vehicle of claim 6 wherein the bulkhead includes a convex side and an opposed concave side, the first panel position causes the concave side to face toward the passenger compartment defining a passenger mode with an increased volume of the passenger compartment, and the second panel position causes the convex side to face toward the passenger compartment defining a cargo mode with an increased volume of the cargo area relative to the passenger mode.

8. The vehicle of claim 1 wherein the vehicle is a pickup truck, the body includes a pair of cargo box side walls defining sides of a cargo area and a floor extending between the cargo box side walls defining a bottom of the cargo area, each of the side walls having full width portions and reduced with portions, with each of the reduced width portions being adjacent to a respective one of the swing arms; and the floor including a pair of bulkhead support slots, each of the support slots located adjacent to a respective one of the reduced width portions and having a respective one of the swing arms extending therethrough.

9. The vehicle of claim 8 wherein each of the swing arms are Z-shaped, including a panel-side portion extending away from the first end, a bodyside portion extending away from the second end and an intermediate portion extending in a nonparallel direction between and connecting the panel-side portion and the bodyside portion; an intersection of the panel-side portion and the intermediate portion forming a first catch that engages with the first mode stop to prevent further rotation in the first direction; and an intersection of the bodyside portion and the intermediate portion forming a second catch that engages with the second mode stop to prevent further rotation in the second direction.

10. The vehicle of claim 1 wherein the body opening surface includes a seal mounted around the perimeter of the body opening and configured to seal against the first surface when the exterior panel is in the first panel position and to seal against the second surface when the exterior panel is in the second panel position.

11. A vehicle comprising:
a body including a body opening surface defining a perimeter of a body opening;
a reconfigurable body exterior panel having a sealing flange including a first surface configured to mount and seal against the body opening surface in a first panel position and an opposed second surface configured to mount and seal against the body opening surface in a second panel position where the exterior panel is in a different orientation relative to the body than when in the first panel position; a pair of panel-side pivot pins secured to the exterior panel and defining a panel pivot axis about which the exterior panel is pivotable; a pair of swing arms each having a first end mounted to a respective one of the panel-side pivot pins and a second opposed end, wherein each of the swing arms are Z-shaped, including a panel-side portion extending away from the first end, a bodyside portion extending away from the second end and an intermediate portion extending in a nonparallel direction between and connecting the panel-side portion and the bodyside portion, an intersection of the panel-side portion and the intermediate portion forming a first catch, and an intersection of the bodyside portion and the intermediate portion forming a second catch; a pair of bodyside pivot pins mounted to the respective second ends of the swing arms and pivotally secured relative to the body for allowing pivoting of the swing arms relative to the body; a first mode stop pin extending from the sealing flange, spaced from the panel-side pivot pins and configured to engage the first catch on one of the swing arms to prevent further rotation of the exterior panel relative to the swing arms in a first direction when the exterior panel is in the first panel position; and a second mode stop pin extending from the sealing flange and spaced from the first mode stop pin and the panel-side pivot pins and configured to engage the second catch on one of the swing arms to prevent further rotation in a second, opposed direction when the exterior panel is in the second panel position.

12. The vehicle of claim 11 wherein the body opening is located on the body between a body interior portion defining a passenger compartment and a cargo area, and the exterior panel is a reconfigurable bulkhead that mounts over the body opening and defines a partition between the passenger compartment and the cargo area.

13. The vehicle of claim 12 wherein the bulkhead includes a convex side and an opposed concave side, the first panel position causes the concave side to face toward the passenger compartment defining a passenger mode with an increased volume of the passenger compartment, and the second panel position causes the convex side to face toward the passenger compartment defining a cargo mode with an increased volume of the cargo area relative to the passenger mode.

14. The vehicle of claim 11 wherein the vehicle is a pickup truck, the body includes a pair of cargo box side walls defining sides of a cargo area and a floor extending between the cargo box side walls defining a bottom of the cargo area, each of the side walls having full width portions and reduced with portions, with each of the reduced width portions being adjacent to a respective one of the swing arms; and the floor including a pair of bulkhead support slots, each of the support slots located adjacent to a respective one of the reduced width portions and having a respective one of the swing arms extending therethrough.

15. The vehicle of claim 11 wherein the exterior panel includes a second, first mode stop pin extending from the sealing flange, spaced from the panel-side pivot pins and configured to engage the first catch on the other of the swing arms to prevent further rotation of the exterior panel relative to the swing arms in a first direction when the exterior panel is in the first panel position; and a second, second mode stop pin extending from the sealing flange and spaced from the second, first mode stop pin and the panel-side pivot pins and configured to engage the second catch on the other of the swing arms to prevent further rotation in a second, opposed direction when the exterior panel is in the second panel position.

* * * * *